(12) United States Patent
Lavertu et al.

(10) Patent No.: US 11,598,249 B1
(45) Date of Patent: Mar. 7, 2023

(54) METHODS AND SYSTEMS FOR MULTI-FUEL ENGINE

(71) Applicant: Transportation IP Holdings, LLC, Norwalk, CT (US)

(72) Inventors: Thomas Michael Lavertu, Ballston Lake, NY (US); Adam Edgar Klingbeil, Ballston Lake, NY (US); Eric Dillen, Edinboro, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 15 days.

(21) Appl. No.: 17/447,800

(22) Filed: Sep. 15, 2021

(51) Int. Cl.
  *F02B 37/12* (2006.01)
  *F02B 39/10* (2006.01)
  *F02D 19/06* (2006.01)
  *F02D 41/00* (2006.01)

(52) U.S. Cl.
  CPC .............. *F02B 37/12* (2013.01); *F02B 39/10* (2013.01); *F02B 2037/122* (2013.01); *F02B 2201/064* (2013.01); *F02D 19/0644* (2013.01); *F02D 41/0025* (2013.01)

(58) Field of Classification Search
  CPC .............. F02B 39/10; F02B 2037/122; F02B 2201/064; F02D 19/0644; F02D 41/0025
  See application file for complete search history.

(56) References Cited

U.S. PATENT DOCUMENTS

2017/0107924 A1\* 4/2017 Blythe ................ F02D 41/0065

FOREIGN PATENT DOCUMENTS

CN        104136739 A   \* 11/2014  .............. F02B 37/00

\* cited by examiner

*Primary Examiner* — Ngoc T Nguyen
(74) *Attorney, Agent, or Firm* — McCoy Russell LLP (57) ABSTRACT

A method and system are provided for adjusting a speed of a turbocharger compressor using an electric motor in response to a relative substitution rate of first and second fuels in a multi-fuel engine.

20 Claims, 5 Drawing Sheets

METHODS AND SYSTEMS FOR MULTI-FUEL ENGINE

BACKGROUND

Technical Field

Embodiments of the subject matter disclosed herein relate to turbocharged internal combustion engines, and more specifically, to changing substitution rates at a wide range of conditions of an internal combustion engine of a vehicle by controlling a turbocharger of the vehicle.

Discussion of Art

Some vehicles with an internal combustion engine (also referred to simply as the engine) may use a turbocharger. One type of turbocharger is an e-turbo. The e-turbo differs from a regular turbocharger in that it may selectively extract excess energy from the exhaust for electrical power or provide additional energy to the compressor through the electric motor. An exhaust gas flow may power a compressor, via spinning the turbine, to provide compressed air to one or more cylinders of the engine. Compressing air in this manner may increase a power and torque of the engine.

The engine may combust multiple types of fuel. The engine may include multiple injectors positioned to inject directly into a combustion chamber and into an intake port of the engine. A first fuel type may be injected directly into the engine via a first set of injectors and a second fuel type may be injected into the intake port of the engine via a second set of injectors. The first fuel type may be a carbon-rich fuel and the second fuel type may be a reduced carbon or carbon-free fuel. Fueling of the engine may be based on a substitution rate, which is based on a substitution of the first fuel type with the second fuel type to decrease carbon emissions. As the substitution rate increases, a desired airflow rate may also increase to accommodate the second fuel type. It may be desirable to have a system and method that differs from those that are currently available.

BRIEF DESCRIPTION

In one embodiment, the current disclosure provides support for a method including adjusting a speed of a compressor in response to a fuel substitution rate of a multi-fuel engine. An electric motor may be used to adjust the speed of the compressor. The method may additionally include adjusting the desired substitution rate in response to one or more conditions including an engine speed, an engine load, an engine torque, a turbocharger speed, an ambient pressure, an ambient temperature, an intake manifold temperature, an intake manifold pressure, and an exhaust manifold pressure. In some examples, additionally or alternatively, the method may include adjusting the desired substitution rate in response to a comparison between a battery state-of-charge (SOC) and a threshold SOC. For example, if the battery SOC is greater than or equal to the threshold SOC, then the electric motor may be used to increase the speed of the compressor, which may provide higher airflow rates to increase an efficiency of higher substitution rates. Alternatively, if the battery SOC is less than the threshold SOC, then the electric motor may not be used to spin the compressor and airflow rates may be reduced during certain engine loads depending on a size of the turbocharger. The substitution rate may be reduced in response to the battery SOC being less than the threshold SOC if airflow rates during lower compressor speeds are insufficient to support higher substitution rates. Operating at the desired substitution rate may include adjusting an amount of a first fuel injected through a direct injector of an engine and adjusting an amount of a second fuel injected through a port-fuel injector of the engine, wherein the first fuel is different from the second fuel.

DETAILED DESCRIPTION

This description and embodiments of the subject matter disclosed herein relate to methods and systems for increasing a performance of an internal combustion engine (ICE). The ICE may operate via a combination of different fuels including different amounts of carbon. In one example, the ICE is a multi-fuel engine configured to combust one or more fuels of varying amounts of carbon. In one example, the ICE is a dual fuel engine configured to combust diesel and hydrogen at various fuel substitution rates. Other fuels which may be combusted by the ICE may include gasoline, alcohol, ammonia, biodiesels, dimethyl ether, and the like. A fuel substitution rate of a primary fuel and a secondary fuel of the ICE may be determined during various loads. The fuel substitution rate may correspond to an injection amount of a fuel with a low carbon-content or zero carbon-content (e.g., hydrogen gas) relative to a more carbon rich fuel. As the substitution rate increases, the amount of fuel with a lower carbon content also increases.

The ICE may have a turbocharger. The turbocharger may be an electric turbocharger, which may be driven via a combination of an electric machine and exhaust gas. Herein, the electric turbocharger may be referred to as an e-turbo. Operation of the e-turbo may be modified to enhance substitution rate conditions. For example, higher air flows may be requested during certain substitution rates, wherein a compressor speed during some conditions of the engine with higher substitution rates may be too low. For example, if a turbocharger is sized to match airflow rates desired during high engine loads, then the turbocharger may be too large for exhaust flow rates at low engine loads, resulting in lower airflow rates. This may decrease substitution rates achievable at lower engine loads. Alternatively, if the turbocharger is sized to match airflow rates during low engine loads, then the turbocharger speed may be too high at high engine loads. A wastegate may be included in the engine system to decrease turbocharger speeds during high loads, which may decrease engine efficiency and increase a packaging size of the turbocharger. In some examples, the compressor speed may be increased via increased electrical energy consumption, resulting in higher compressor speeds than those provided via current exhaust gas production. Additionally or alternatively, the turbocharger speed may be increased via an engine power output without electrical energy consumption from a battery or other energy storage device. By doing this, fuel substitution conditions may be enhanced during a broader range of ICE operation. Herein, compressor speed and e-turbo speed may be used interchangeably.

Figure 1A:
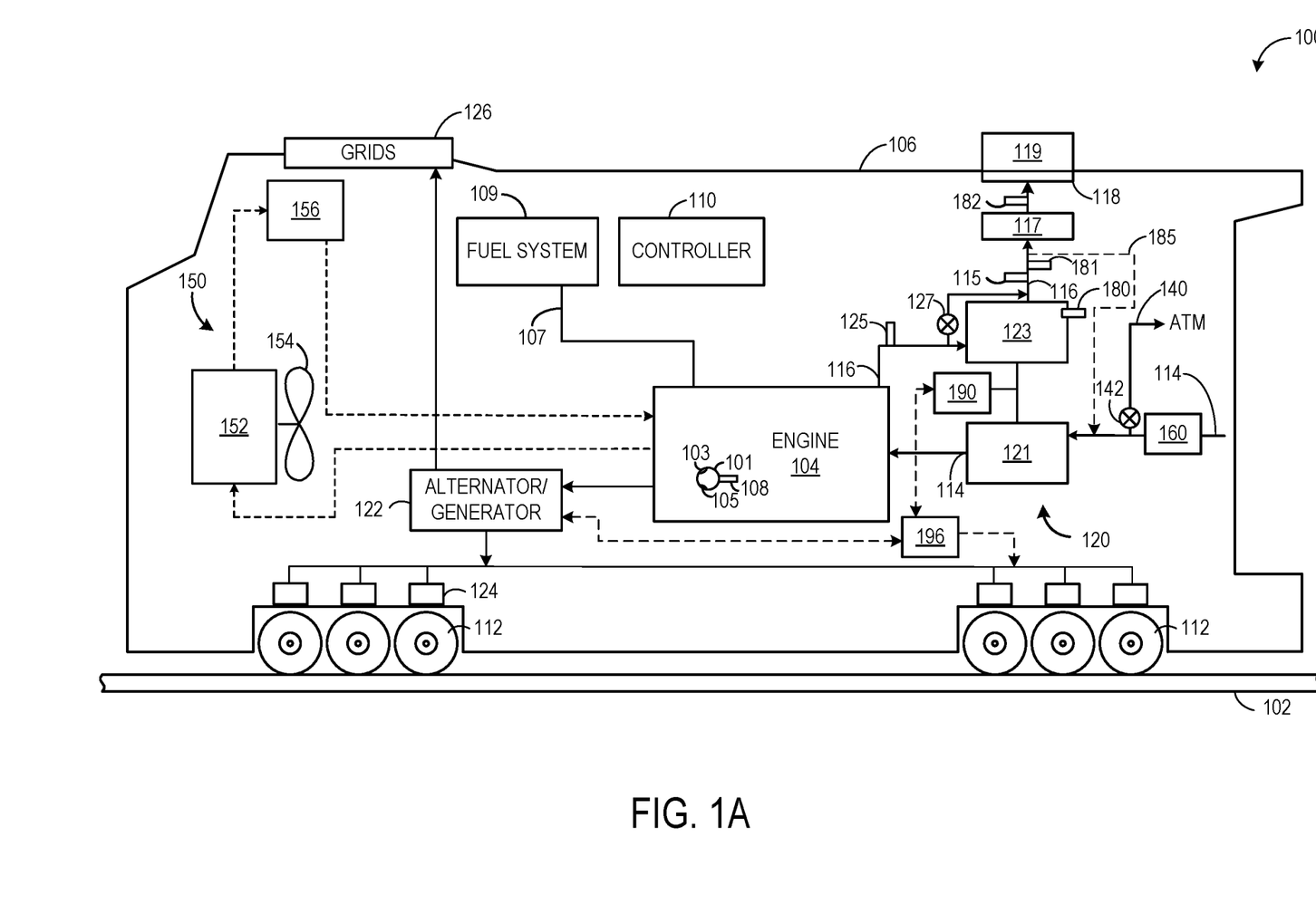
FIG. 1A shows a schematic diagram of a vehicle system with an engine, according to an embodiment of the present disclosure.
Figure 2:
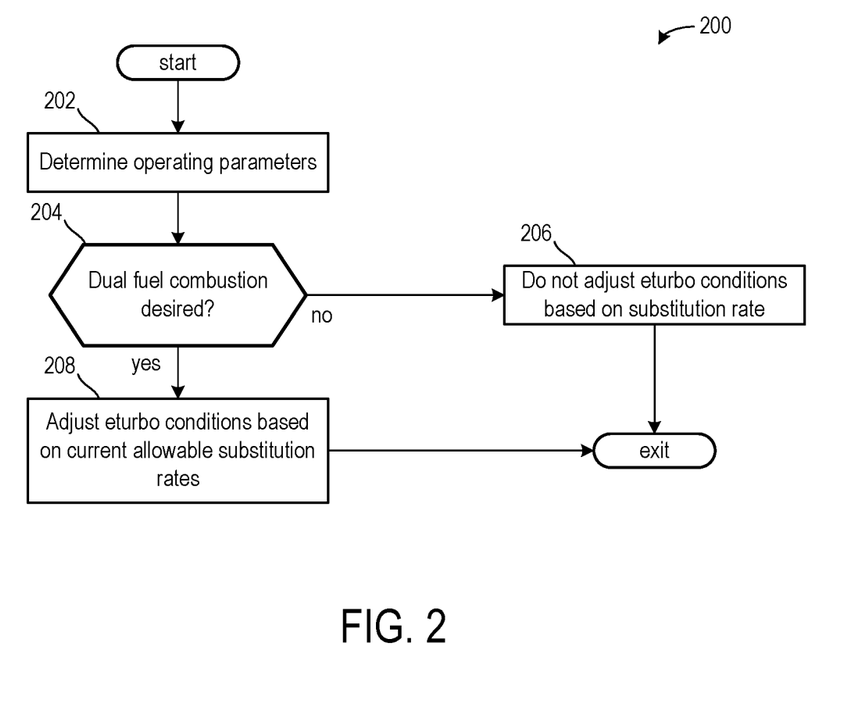
FIG. 2 shows a method for adjusting operation of an e-turbo based on a desired substitution rate.
Figure 3:
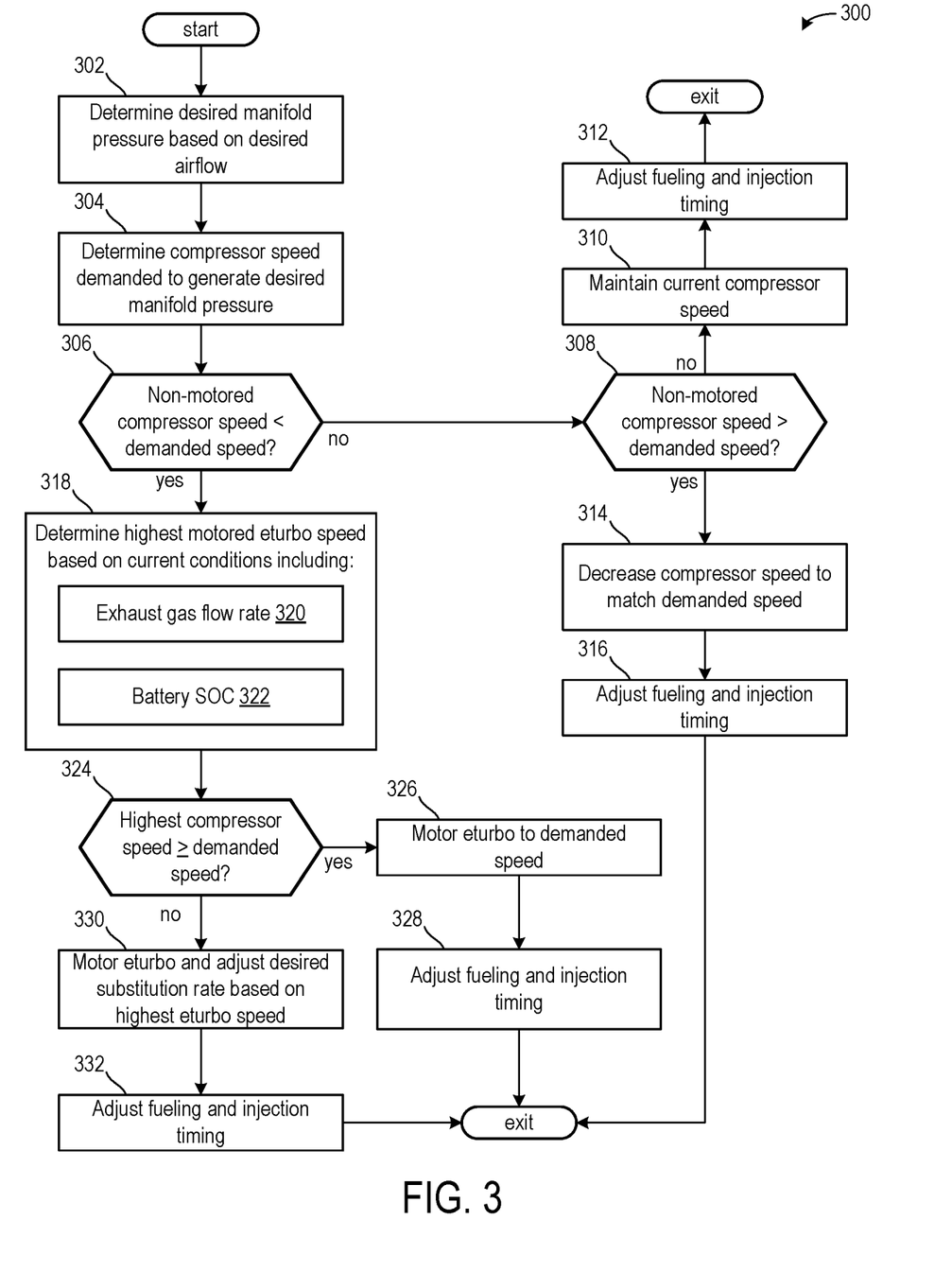
FIG. 3 shows a method for determining a manifold pressure and adjusting a compressor speed based on the manifold pressure.
Figure 4:
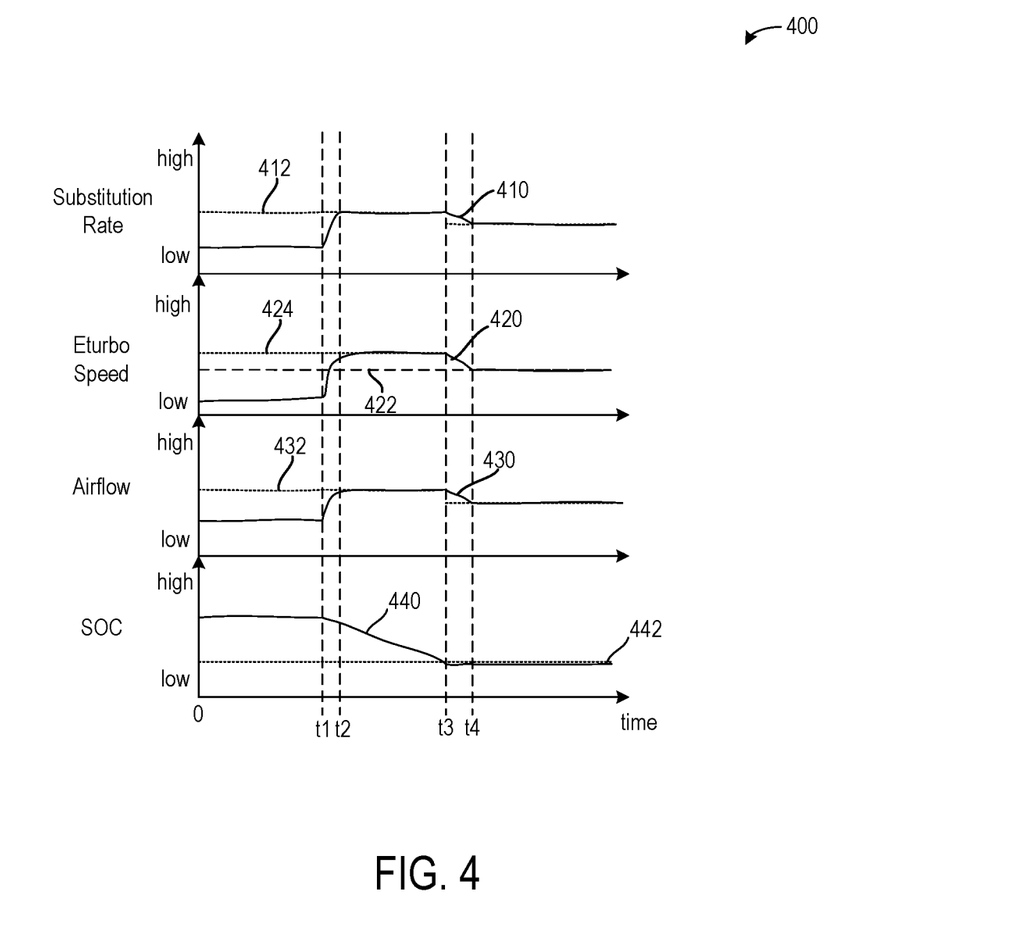
FIG. 4 shows a prophetic operating sequence illustrating adjustments to the e-turbo based on the desired substitution rate and the current airflow.

FIG. 1A illustrates an example of a vehicle system that includes an engine, an e-turbo, an aftertreatment system, a fuel system and a control system. A controller of the vehicle system may use a plurality of different control strategies to adjust a speed of e-turbo based on determined substitution rates, as shown in the methods of FIGS. 2 and 3. An exemplary timing of operations of the methods is shown in FIG. 4.

Referring to FIG. 1A, a block diagram of an embodiment of a vehicle system 100 (e.g., an engine system) is shown, including a vehicle 106. In the illustrated embodiment, the vehicle is a rail vehicle (e.g., a locomotive) that may operate on a rail 102 via a plurality of wheels 112. In another embodiment, the vehicle system may be disposed in a vehicle such as an automobile or a truck. In still other embodiments, the vehicle system may include mining equipment, agricultural equipment, industrial equipment, or any other equipment that relies on tractive effort generated by a combination of one or more engines and one or more motors.

Figure 1B:
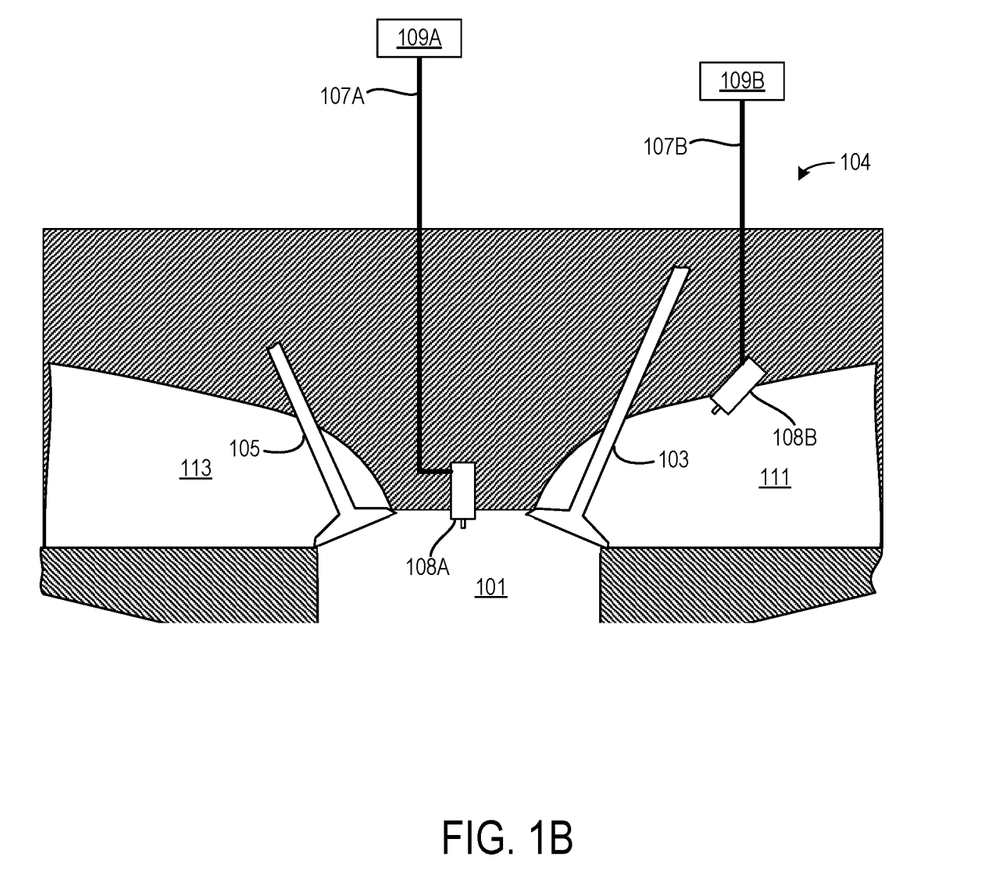
FIG. 1B shows a detailed view of a cylinder of the engine.

The vehicle system includes an engine 104, shown in detail in FIG. 1B. The engine includes a plurality of cylinders, including the cylinder 101 that each include at least one intake valve 103, at least one exhaust valve 105, and injectors 108 including at least one direct fuel injector 108A and at least one port-fuel injector 108B. Each fuel injector may include an actuator that may be actuated via a signal from a controller 110 of the engine. The cylinders of the engine may receive fuel from a fuel system 109 via a fuel conduit 107. In some examples, the fuel conduit may be coupled with a common fuel rail and a plurality of fuel injectors. More specifically, the direct fuel injector 108A may receive fuel from a first fuel system 109A via a first fuel conduit 107A. The port-fuel injector 108B may receive fuel from a second fuel system 109B via a second fuel conduit 107B. The first fuel system may supply a carbon-containing fuel and the second fuel system may supply a carbon-free fuel. In one example, the carbon-containing fuel may include one of gasoline, diesel, biodiesel, natural gas, and alcohol. The carbon-free fuel may include one or more of ammonia and hydrogen. In some examples, the engine may be a spark-free engine. In other examples, the engine may be a spark-ignited engine. Additionally or alternatively, other injectors may be positioned to provide other types of fuels from a third fuel tank such that the engine may be configured as a multi-fuel engine.

In one example, the engine may combust one or more fuel types delivered thereto. For example, the direct injector may inject diesel directly to the cylinder and the port-fuel injector may inject hydrogen directly into an intake port 111. In one example, the diesel is injected as a liquid fuel and the hydrogen is injected as a gaseous fuel. The diesel and hydrogen may mix within an interior volume of the cylinder. Following combustion, the exhaust valve may expel combustion products from the cylinder to an exhaust port 113.

During operation, each cylinder within the engine may use a four stroke cycle. The cycle includes the intake stroke, compression stroke, expansion stroke, and exhaust stroke. During the intake stroke, generally, the exhaust valve closes and the intake valve opens. Air is introduced into the combustion chamber via the intake manifold, and the piston moves to the bottom of the cylinder so as to increase the volume within the combustion chamber. The position at which the piston is near the bottom of the cylinder and at the end of its stroke (e.g. when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which piston is at the end of its stroke and closest to the cylinder head (e.g. when the combustion chamber is at its smallest volume) is typically referred to by those of skill in the art as top dead center (TDC). In a process hereinafter referred to as direct injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC. Note that the above is described merely as an example, and that intake and exhaust valve opening and/or closing timings may vary, such as to provide positive or negative valve overlap, late intake valve closing, or various other examples. For example, a timing of the opening and/or closing of the intake and/or exhaust valves may be advanced to reduce a temperature of exhaust gases entering an aftertreatment system of the vehicle system, to increase an efficiency of the aftertreatment system. Further, in some examples a two-stroke cycle may be used rather than a four-stroke cycle.

The engine may receive intake air for combustion from an intake passage 114. The intake air includes ambient air from outside of the vehicle flowing into the intake passage through an air filter 160. The intake passage may include and/or be coupled to an intake manifold of the engine. Exhaust gas resulting from combustion in the engine is supplied to an exhaust passage 116 via the exhaust port. Exhaust gas flows through the exhaust passage, to a muffler 118, and out of an exhaust stack 119 of the vehicle.

In one example, the vehicle is a diesel-electric vehicle, where the engine may be coupled to an electric power generation system, including an alternator/generator 122 and electric traction motors 124. The alternator/generator may additionally include a direct current (DC) generator. In other examples, the engine may be a diesel engine, a gasoline engine, a biodiesel engine, an alcohol or hydrogen engine, a natural gas engine (spark or compression ignition), or a combination of two or more of the foregoing that generates a torque output during operation. The torque output may be transmitted to the electric generator or alternator through a mechanical coupling from the engine. As depicted herein, six pairs of traction motors correspond to each of six pairs of motive wheels of the vehicle. In another example, alternator/generator may be coupled to one or more resistive grids 126 or an energy storage device. The resistive grids may dissipate excess engine torque and/or electricity generated by traction motors in dynamic braking mode via heat produced by the grids from generated electricity. The energy storage device may be used to capture dynamic braking energy, or from the generator directly, or from any one of a number of selectively couplable sources of electricity (and conversely may pay out energy as may be useful).

The vehicle system may include a turbocharger 120 that may be arranged between the intake passage and the exhaust passage. The turbocharger increases air charge of ambient air drawn into the intake passage in order to provide greater charge density during combustion to increase power output and/or engine-operating efficiency. The turbocharger may include a compressor 121 (disposed in the intake passage) which may be at least partially driven by a turbine 123 (disposed in the exhaust passage). In one embodiment, the turbine may be a fixed geometry turbine. In another embodiment, the turbine may be a variable geometry turbine (VGT). In a VGT a variable vane control adjusts a position of variable geometry turbine vanes. Exhaust gases may pass through the turbine supplying little energy to rotate the turbine when vanes are in an open position, while exhaust gases may pass through the turbine and impart increased force on the turbine when vanes are in a closed position. As the turbine rotates, heat and kinetic energy in the exhaust gases may be converted into mechanical energy, which may be used to drive the compressor of the turbocharger to deliver compressed air to the engine intake (e.g., to provide a pressure boost to cylinders of the engine based on engine operating conditions). While a single turbocharger is included in FIG. 1A, the system may include multiple turbine and/or compressor stages. The turbine may include a turbine speed sensor 180, and a turbine inlet temperature sensor 125 may be positioned in the exhaust passage, upstream of an inlet of the turbine.

In another embodiment, the turbocharger may be an e-turbo, where an electrical machine 190 mechanically coupled to the turbine may convert the mechanical energy into electrical energy. The e-turbo may be integrated into a shaft of the turbocharger, where the compressor and the turbine are mechanically linked. The e-turbo may be operated as a motor/generator that can be used to motor the shaft (e.g., speed it up) to increase a work output of the compressor or slow the shaft down to extract excess energy. While operating in a generating mode, extracting the excess exhaust energy may result in improved overall engine efficiency. While operating in a motoring mode, the compressor may provide additional airflow to the engine, which may improve a combustion and/or an emissions of the vehicle. Additionally, the electrical energy may be used to power one or more accessory devices of the vehicle, such as an electric motor, and/or stored in an energy storage device 196 (e.g., a battery, capacitor bank, or electro-chemical converter). In one example, the electric motor powers one or more wheels of the vehicle.

As will be described in greater detail herein, operation of the e-turbo may be adjusted in response to a desired substitution rate. The desired substitution rate may correspond to a mixing of a first fuel type and a second fuel type. In one example, the desired substitution rate may decrease carbon emissions by substituting a carbon-containing fuel with a carbon-free fuel. In one example, the carbon-free fuel is injected in a gaseous state, which may be prone to engine knock. To mitigate a likelihood of knock while also increasing a substitution rate of the carbon-free fuel, airflow may be increased. Airflow rates may be dependent on one or more conditions, including engine load, compressor speed, and a throttle position. The e-turbo may be operated to increase a range in which the substitution rates may be increased by intrusively increasing the compressor speed, which may increase airflow rates. Intrusively increasing the compressor speed may include increasing the compressor speed to a speed greater than that provided solely by input from the turbine. For example, the e-turbo may be sized to accommodate high load engine conditions. However, this may result in a drop in airflow rates at lower engine loads, which may result in reduced substitution rates. By utilizing the electric machine as a motor to increase the e-turbo speed in combination with exhaust gas flows, increased substitution rates may be achieved over a broad engine load range.

Alternatively, if the e-turbo is sized for low engine loads, then the airflow rates at high engine loads may be too high and inclusion of a wastegate may be desired. The wastegate may decrease engine efficiency while also increase a packaging size thereof. As such, it may be desired to size the e-turbo based on high engine loads to omit inclusion of the wastegate.

Additionally, a wastegate 127 may be disposed in a bypass passage around the turbine, which may be adjusted, via actuation from the controller, to increase or decrease exhaust gas flow through the turbine. For example, opening the wastegate (or increasing the amount of opening) may decrease exhaust flow through the turbine and correspondingly decrease the rotational speed of the compressor. As a result, less air may enter the engine, thereby decreasing the combustion air-fuel ratio.

The vehicle system may further include a cooling system 150 (e.g., an engine cooling system). The cooling system may circulate coolant through the engine to absorb waste engine heat to distribute to a heat exchanger, such as a radiator 152 (e.g., a radiator heat exchanger). In one example, the coolant may be water, anti-freeze, or a mixture of the two. In another example, the coolant may be oil. A fan 154 may be further coupled to the radiator to maintain an airflow through the radiator when the vehicle is moving slowly or stopped while the engine is running. In some examples, a fan speed may be controlled by a controller 110. Coolant that is cooled by the radiator may enter a tank (not shown in FIG. 1A). The coolant may then be pumped by a pump 156 back to the engine or to another component of the vehicle system.

The vehicle system may include an aftertreatment system 117 coupled in the exhaust passage downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems. In one example, an aftertreatment temperature sensor 115 is arranged at or upstream of an inlet of the aftertreatment system, which may measure a temperature of exhaust gas prior to entering the aftertreatment system. Additionally, one or more AFR sensors or oxygen ($O_2$) sensors may be arranged on an exhaust conduit upstream and/or downstream of the aftertreatment system. For example, an AFR sensor or $O_2$ sensor 181 may be arranged at the inlet of the aftertreatment system, which may estimate an AFR of the engine from the exhaust gas prior to entering the aftertreatment system, or an AFR sensor or $O_2$ sensor 182 may be arranged downstream of the aftertreatment system (e.g., at an exhaust pipe), which may estimate the AFR from exhaust gas exiting the aftertreatment system.

Catalysts are shown to exhibit a maximum (e.g., peak) NOx conversion at a particular exhaust gas temperature. As such, for minimizing vehicle emissions, it may be desirable to maintain temperatures within a range of temperatures near a peak conversion of the catalyst used in the exhaust gas aftertreatment system. For example, no oxidation or conversion may occur at low exhaust gas temperatures (e.g., below approximately 120° C.). As a temperature of a catalyst in the aftertreatment system increases, the oxidation or conversion rates may increase. As the catalyst temperature is raised above a threshold temperature (e.g., 150° C.), the conversion rates may increase steeply with increasing temperature to maximum conversions rates (e.g., 90% for carbon monoxide (CO) and 70% for hydrocarbon (HC)). At high temperatures (e.g., 250° C.-350° C.), the catalyst performance stabilizes to form a characteristic plateau on the light-off curve. As such, it may be desirable, for minimizing vehicle emissions, to maintain exhaust gas temperatures above the plateau temperature, within a range in which typical exhaust gas aftertreatment systems exhibit near maximum conversion efficiency.

The vehicle system may include an exhaust gas recirculation (EGR) system 185 coupled to the engine. The EGR system may route exhaust gas from the exhaust passage of the engine to the intake passage downstream of the turbocharger. In some embodiments, the exhaust gas recirculation system may be coupled exclusively to a group of one or more donor cylinders of the engine (also referred to as a donor cylinder system).

The controller may control various components and operations related to the vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of vehicle operation. In some examples, the controller may include more than one controller each in communication with one another, such as a first controller to control the engine and a second controller to control other operating parameters of the vehicle (such as engine load, engine speed, brake torque, etc.). The first controller may be configured to control various actuators based on output received from the second controller and/or the second controller may be configured to control various actuators based on output received from the first controller.

The controller may receive information from a plurality of sensors and may send control signals to a plurality of actuators. The controller, while overseeing control and management of the vehicle, may receive signals from a variety of engine sensors. The signals may be used to determine operating parameters and operating conditions, and correspondingly adjust various engine actuators to control operation of the vehicle. For example, the engine controller may receive signals from various engine sensors including, but not limited to, engine speed, engine load (derived from fueling quantity commanded by the engine controller, turbocharger speed, fueling quantity indicated by measured fuel system parameters, averaged mean-torque data, manifold pressure, and/or electric power output from the alternator or generator), mass airflow amount/rate (e.g., via a mass airflow meter), intake manifold air pressure, boost pressure, exhaust pressure, ambient pressure, ambient temperature, exhaust temperature (such as the exhaust temperature entering the turbine, as determined from the turbine inlet temperature sensor 125, or the exhaust temperature entering the aftertreatment system, as determined from the inlet temperature sensor 115), particulate filter temperature, particulate filter back pressure, engine coolant pressure, exhaust oxides-of-nitrogen quantity (from NOx sensor), exhaust soot quantity (from soot/particulate matter sensor), exhaust gas oxygen level sensor, or the like. Correspondingly, the controller may control the vehicle by sending commands to various components such as the traction motors, the alternator/generator, cylinder valves, fuel injectors, a notch throttle, the compressor bypass valve (or an engine bypass valve in alternate embodiments), the wastegate, or the like. Other actively operating and controlling actuators may be coupled to various locations in the vehicle.

Further, the controller may monitor and/or control an engine throttle setting. For example, this may be performed for an engine governor. The engine governor may react to the engine throttle setting in order to adjust engine operation. In one embodiment, the throttle setting may be infinitely adjustable. In another embodiment, an operator of the vehicle may adjust an input device between a plurality of determined engine throttle settings referred to as notches. Based on the selected engine notch setting, the controller may adjust engine operation to provide the desired engine performance (e.g., such as a desired vehicle speed). As an example, the plurality of engine notch settings may include a notch 0, a notch 1, a notch 2, a notch 3, a notch 4, a notch 5, a notch 6, a notch 7, and a notch 8. An increase in the numerical value of the notch may correspond (directly or indirectly) with an increase in vehicle speed and/or with engine power output. It may further make adjustments to fuel injection timing and fuel rail pressure. For example, notch 0 may correspond to not moving the locomotive, notch 4 may provide a mid-level of speed, and notch 8 may be the maximum speed setting. For example, the controller may adjust engine revolutions per minute (RPM), gearing, valve timings, and other parameters in order to move the vehicle at a speed corresponding to the selected engine notch. For example, the engine may be adjusted to generate more power in order to increase the vehicle speed, or to accommodate a heavy load (e.g., due to cargo and/or grade) at a lower vehicle speed.

Turning now to FIG. 2, a high-level flowchart is shown of a method 200 for controlling an e-turbo (e.g., the turbocharger 120 of vehicle system 100 of FIG. 1) of the vehicle, wherein an electric machine is mechanically coupled to the e-turbo to increase or decrease turbine and compressor speeds. In one example, a strategy for controlling the e-turbo includes adjusting an e-turbo speed in response to a demanded intake air flow rate based on a desired substitution rate. The method 200 may be executed by a processor of a controller of the vehicle, such as the controller of the vehicle of FIG. 1, based on instructions stored in a memory of the controller.

The method 200 may begin at step 202 by estimating and/or measuring one or more vehicle operating conditions. Vehicle operating conditions may be estimated based on one or more outputs of various sensors of the vehicle (e.g., such as one or more exhaust temperature sensors, an engine, wheel, and/or an e-turbo shaft speed sensor, a torque sensor, a pressure sensor, etc., as described above in reference to the vehicle system of FIG. 1). Vehicle operating conditions may include engine velocity and load, vehicle velocity, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor velocity, battery charge, engine torque output, vehicle wheel torque, and the like.

At step 204, the method includes determining if dual fuel combustion is desired. Dual fuel combustion may include combustion of a primary fuel and a secondary fuel. In one example, the primary fuel is a liquid fuel and the secondary fuel is a gaseous fuel. Additionally or alternatively, the primary fuel may be a carbon-rich fuel and the secondary fuel may be a carbon-poor fuel comprising fewer carbons per molecule than the carbon-rich fuel. Additionally or alternatively, the primary fuel may be a carbon-containing fuel and the secondary fuel may be a carbon-free fuel. Multi-fuel combustion may decrease carbon emissions of the vehicle by increasing an amount of the secondary fuel and decreasing an amount of the primary fuel. In one example, the multi-fuel combustion is a dual fuel combustion including diesel as the primary fuel and hydrogen as the secondary fuel. In some examples, a fuel substitution rate may include greater than two fuels injected as liquids or gases. Conditions that may impact a fuel substitution rate may include engine airflow, engine load, intake manifold temperature, ambient pressure and temperature, exhaust manifold pressure, and the like. The fuel substitution rate may be defined as a percentage of energy content of each fuel. For example, if the fuel substitution rate is 60%, then the carbon-free fuel may comprise 60% of the total fuel energy and the carbon-containing fuel may comprise 40% of the total fuel energy.

A desired fuel substitution rate may be based on the fuel substitution rate. In one example, the fuel substitution rate is a range of substitution rates at which the engine may operate under current operating parameters. The desired substitution rate may be a single rate with a reduced carbon-emissions and/or increased efficiency relative to other fuel substitution rates. In one example, the desired substitution rate may be balanced based on a desired airflow rate while remaining below pre-turbine temperature limits, preventing knock, and adjusting injection timing/airflow for NOx to be at or below limits.

Additionally or alternatively, in some examples, the desired substitution rate may be adjusted in response to carbon emissions and/or $NO_x$ emissions. For example, as carbon emissions increase, then it may be desired to increase the substitution rate. Alternatively, as $NO_x$ emissions increase, then it may be desired to decrease the substitution rate.

In some examples, additionally or alternatively, the desired substitution rate may be adjusted in response to a comparison of a battery SOC to a threshold SOC. The threshold SOC may be based on a non-zero, positive number. In one example, the threshold SOC is equal to 20% of a full battery charge. Additionally or alternatively, the threshold SOC may be a dynamic value based on other electrical energy demands of the vehicle. For example, use of electrically driven auxiliary components may increase the threshold SOC to, for example, 30 of 40% of the full battery charge. If the battery SOC is less than the threshold SOC, then the electric motor may not increase the turbine and compressor speeds. As such, the desired substitution rate may be limited to an airflow rate corresponding to a highest compressor speed without electric motor assistance (e.g., motoring). The highest compressor speed may be based on engine airflow, engine load, and intake manifold temperature. In such an example, the desired substitution rate may be reduced in response to the battery SOC being less than the threshold SOC.

In another example, if the battery SOC is greater than or equal to the threshold SOC, then the electric motor may increase the turbine and compressor speeds to speeds higher than those set by the engine load and intake manifold temperature. The increased compressor speed with motoring may increase an airflow rate for a given engine load without motoring, thereby allowing higher substitution rates, if desired. In some examples, it may not be desired to utilize a highest compressor speed with motoring based on other engine conditions, such as engine temperature, manifold temperature, and $NO_x$ output.

If dual fuel combustion is not desired, then at step 206, the method may include not adjusting the e-turbo operation based on the desired substitution rate. The e-turbo may be operated as a motor/generator based on other engine conditions (e.g., driver demand).

If dual fuel combustion is desired, then at step 208, the method may include adjusting the e-turbo operation based on the desired substitution rate. The e-turbo operation may be adjusted to match a difference between airflow rates of a current substitution rate and a desired substitution rate. If the difference is negative, and less airflow is desired due to the desired substitution rate being less than the current substitution rate, then the electric motor may decrease the turbine and compressor speeds, which may correspond to a generator mode. This may result in the battery SOC increasing. If the difference is positive, and more airflow is desired due to the desired substitution rate being greater than the current substitution rate, then the electric motor may increase the turbine and compressor speeds, thereby decreasing the battery SOC.

Additionally or alternatively, the eturbo may provide excess power to the vehicle wheels. If a current airflow rate is above a desired airflow rate due to the eturbo speed being greater than a demanded eturbo speed, then excess eturbo power may be used to power the vehicle wheels in combination with the engine. If the current airflow rate is less than the desired airflow rate due to the eturbo speed being less than the demanded eturbo speed, then the eturbo speed may be increased by increasing the engine power output to an amount greater than a driver demand.

Turning now to FIG. 3, it shows an example of a method 300 for adjusting an e-turbo operation in response to a comparison between a current airflow and a desired airflow for a desired substitution rate. In one example, the method may be a continuation of the method of FIG. 2 following step 208.

The method may begin at step 302 by determining a desired manifold pressure based on a desired airflow rate. The desired airflow rate may be based on the desired substitution rate. As the desired substitution rate increases, the desired airflow rate may increase. Increasing an air flow rate may improve combustion efficiency and decrease a likelihood of knock or misfire that is associated with the increased substitution rate. The desired manifold pressure may increase as the desired airflow rate increases. Thus, the desired manifold pressure may increase as the desired substitution rate increases.

At step 304, a compressor speed demanded may be determined. The compressor speed may be controlled to generate the desired manifold pressure. In one example, the demanded compressor speed increases as the desired manifold pressure increases. The demanded compressor speed may be determined via a turbo map or other look up table with manifold pressure as an input and compressor speed as an output. As another example, the desired manifold pressure may be a target manifold pressure, wherein the compressor may be operated to meet the target manifold pressure while remaining below an upper compressor speed limit. In one example, the upper compressor speed limit may be based on a choke limit or mechanical properties of the compressor.

At step 306, a non-motored compressor speed may be compared to the demanded compressor speed. In one example, the non-motored compressor speed is equal to a current compressor speed without assistance from the electric motor. Thus, the non-motored compressor speed may be based on an exhaust gas flow rate, nozzle vane position, throttle position, engine load, airflow rate, and intake manifold temperature.

If the non-motored compressor speed is not less than the demanded speed (e.g., greater than or equal to), then at step 308, if the non-motored compressor speed is greater than the demanded speed. In one example, the non-motored compressor speed may be greater than the demanded speed during a high-load, where exhaust gas production is relatively high compared to lower loads. If the non-motored compressor speed is not greater than the demanded speed, then at step 310, the method may include maintaining the current compressor speed.

At step 312, the method may include adjusting engine fueling to match the desired substitution rate. Adjusting fueling to match the desired substitution rate may include adjusting an amount of the carbon-containing fuel and the carbon-free fuel. In one example, the amount of the carbon-containing fuel is decreased and the amount of the carbon-free fuel is increased if the desired substitution rate is greater than a previous desired substitution rate. In another example, the amount of the carbon-containing fuel is increased and the amount of the carbon-free fuel is decreased if the desired substitution rate is less than a previous desired substitution rate.

Additionally or alternatively, an injection timing may be adjusted based on the substitution rate. For example, the injection timing may be more advanced (e.g., earlier) as the substitution rate decreases. As another example, the injection timing may be more retarded (e.g., later) as the substitution rate increases. Additionally or alternatively, the timing of the injections for the carbon-containing fuel and the carbon-free fuel may differ. For example, the carbon-free fuel may be injected during the intake stroke and the carbon-containing fuel may be injected during the compression stroke or the expansion stroke. Timing of the injections may be individually injected in response to the substitution rate. In one example, a timing of the injection of the carbon-free fuel may be maintained independent of the substitution rate. A timing of the injection of the carbon-containing fuel, which may be an ignition source, may be adjusted. For example, the timing of the injection of the carbon-containing fuel may be delayed as the substitution rate increases. By delaying the injection of the carbon-containing fuel, a pressure rise rate during combustion may be reduced. Alternatively, the timing of the injection of the carbon-containing fuel may be advanced as the substitution rate decreases.

If the non-motored compressor speed is greater than the demanded compressor speed, then at step 314, the method may include decreasing the compressor speed to match the demanded compressor speed. In one example, the decreasing the compressor speed may include slowing a shaft speed of the e-turbo via the electric motor. In one example, the electric motor may enter a generator mode and decrease the turbine and compressor speeds via slowing the shaft, which may replenish a SOC of the battery while also allowing the desired manifold pressure to be realized. Additionally or alternatively, the turbine may be used to power wheels with the engine, which may increase engine efficiency. By assisting the engine in driving the wheels, the airflow rate generated by the compressor may be reduced to match a desired airflow rate.

At step 316, the method may include adjusting the fueling and injection timing based on the desired substitution rate, similar to step 312.

Returning to step 306, if the non-motored compressor speed is less than the demanded compressor speed for the desired substitution rate, then at step 318a highest motored e-turbo speed is determined based at least in part on current conditions. Current conditions may include but are not limited to one or more of a current exhaust gas flow rate 320 and optionally a battery state-of-charge (SOC) 322. The current exhaust gas flow rate may be sensed via an exhaust gas flow sensor. The current exhaust gas flow rate may be based on one or more of an engine load, a throttle position, an air/fuel ratio, and a high pressure exhaust gas recirculation (HP-EGR) rate.

The battery SOC may be sensed via a multimeter configured to sense a battery voltage. Additionally or alternatively, the battery SOC may be tracked over time by measuring a current flow to and from the battery. The highest e-turbo speed may be based on each of the exhaust gas flow rate and the battery SOC. In one example, the highest e-turbo speed may be calculated based on turbine conditions configured to increase the turbine, and therefore the compressor speed. For example, the highest e-turbo speed may be calculated based on the wastegate being closed, the nozzle vanes being open, and an HP-EGR rate being relatively low.

At step 324, if the highest motored e-turbo speed is determined to be greater than or equal to the demanded compressor speed. If the highest motored e-turbo speed is greater than or equal to the demanded compressor speed, then the desired manifold pressure may be met via a combination of exhaust gas and the electric motor driving the e-turbo.

At step 326, the method may include motoring the e-turbo to match the demanded compressor speed. In one example, the electric motor may increase the turbine and compressor speeds. In another example, the engine may be operated to increase the turbine and compressor speeds. An engine power may be increased to a power output greater than a driver demand. The extra power, equal to the difference between the engine power and the driver demanded power, may be used to drive the compressor and provide additional airflow. In one example, the e-turbo may be driven to its maximum speed based on current conditions or to a lower speed than the maximum speed based on the demanded compressor speed.

At step 328, the method may include adjusting the fueling and injection timing, as described above.

If the highest motored compressor speed is not greater than or equal to the demanded compressor speed, then at step 330, the method may include motoring the e-turbo to the highest e-turbo speed based on current conditions. In one example, if the battery SOC is less than a threshold SOC, then a desired amount of electrical energy from the battery may not be available to drive the e-turbo to the demanded compressor speed. In another example, the engine may not be driven to increase the turbo speed based on current operating conditions. For example, if the driver demand is relatively high, then the maximum speed of the e-turbo may be reduced.

Additionally, the desired substitution rate may be adjusted based at least in part on the highest e-turbo speed. In one example, the desired substitution rate may be adjusted to a lower substitution rate based on the highest e-turbo speed. For example, if an initial desired substitution rate included 85% substitution of the carbon free fuel, the adjusted desired substitution rate may include less than 85% substitution of the carbon-free fuel based on the highest e-turbo speed. By doing this, a demanded compressor speed may be reduced to match the highest compressor speed based on current operating conditions.

At step 332, the fueling and injection timing may be adjusted to match the adjusted substitution rate, as described.

In some examples, if a current substitution rate is at the desired substitution rate and a current airflow rate is greater than a desired airflow rate, the desired airflow rate based on the desired substitution rate, then the current airflow rate may be reduced. Additionally or alternatively, the desired substitution rate may be increased to a substitution rate corresponding to the current airflow rate.

Turning now to FIG. 4, a timing diagram 400 is shown that illustrates adjustments to one or more engine conditions in response to a desired substitution rate. The desired substitution rate may be adjusted in response to one or more conditions. These conditions may include engine speed, engine load/torque, turbo speed, ambient pressure, ambient temperature, intake manifold temperature, fuel type or purity, and exhaust manifold pressure. The timing diagram illustrates time plotted along an abscissa.

Plot 410 illustrates a substitution rate and dashed line 412 illustrates a desired substitution rate. Plot 420 illustrates an e-turbo speed, dashed line 422 illustrates a demanded e-turbo speed, and dashed line 424 illustrates a maximum e-turbo speed without electric motor assistance (e.g., motoring). Plot 430 illustrates an airflow rate and dashed line 432 illustrates a desired airflow rate. Plot 440 illustrates a battery SOC and plot 442 illustrates a threshold SOC.

In some examples, the substitution rate may not be adjusted based on a battery SOC. For example, the battery may be omitted or the e-turbo may not be configured to drive off electrical energy. The engine may adjust the e-turbo speed via directly driving a shaft thereof via rotational energy produced via the engine. During some conditions, exhaust gases and engine rotational energy may be used to drive the e-turbo. In this way, the substitution rate may be adjusted based on an adjustable engine power output based on current operating conditions.

Prior to t1, the current substitution rate (plot 410) is relatively low and less than a desired substitution rate (dashed line 412). In one example, the desired substitution rate may be determined for current conditions and/or upcoming conditions. For example, during operation of a substitution rate at a given set of conditions, it may be determined that a different substitution rate may be desired to enhance vehicle operation at the given set of conditions. Additionally or alternatively, a desired substitution rate may be determined for upcoming conditions predicted based on a change in operating conditions including one or more of a gear change, an ambient temperature, an engine temperature, an intake manifold temperature, and an exhaust manifold pressure. Additionally or alternatively, the desired substitution rate may be based on a fuel economy, battery SOC (plot 440), and vehicle location. For example, some locations may restrict carbon emissions to a greater extent than other locations, thereby increasing the desired substitution rate. Alternatively, some locations may restrict nitrogen emissions to a greater extent, thereby decreasing the desired substitution rate.

In one example, the desired substitution rate increases above the substitution rate in response to a change or predicted change in an engine condition promoting increased substitution rate. As such, the desired airflow rate (dashed line 432) increases above the current airflow rate (plot 430). The desired e-turbo speed (dashed line 424) increases above the current e-turbo speed (dashed line 420). The maximum e-turbo speed without motoring (dashed line 422) may be determined based on an engine airflow, engine load, and/or intake manifold temperature. The battery SOC (plot 440) is greater than the threshold SOC (dashed line 442). As such, the battery may be used to power an electric motor to increase the e-turbo speed. In the example of FIG. 4, the threshold SOC is a fixed value based on a total SOC of the battery. The threshold SOC may be a percentage (e.g., 10%) of the total SOC.

At t1, the e-turbo speed begins to increase toward the desired e-turbo speed. Between t1 and t2, the electric motor, in combination with the turbine, may rotate the e-turbo shaft and rotate the compressor. As the e-turbo speed increases, the airflow rate may also increase toward the desired airflow rate. The battery SOC begins to decrease as the electric motor increases the e-turbo speed. In one example, as the airflow rate increases, the substitution rate may increase toward the desired substitution rate. As such, an amount of carbon-free fuel may increase and an amount of carbon-containing fuel may decrease.

At t2, the e-turbo speed is equal to the desired e-turbo speed and the airflow rate is equal to the desired airflow rate. The substitution rate is equal to the desired substitution rate. Between t2 and t3, the battery SOC decreases toward the threshold SOC.

At t3, the battery SOC decreases to a SOC below the threshold SOC. Thus, the electric motor may no longer be used to spin the e-turbo. Between t3 and t4, the e-turbo speed begins to decrease toward the highest e-turbo speed without motoring. The substitution rate decreases to a desired substitution rate based on the highest e-turbo speed without motoring, which is less than the desired substitution rate with the e-turbo being motored. In one example, conditions including an engine speed, engine load, engine torque, ambient pressure, ambient temperature, and other conditions that may affect the substitution rate may remain relatively constant from t2 to after t3. Thus, the substitution rate adjustment at t3 may be based on only the battery SOC decreasing below the threshold speed with all other conditions affecting substitution rate remaining relatively constant, which decreases the highest airflow rate available due to the e-turbo speed decreasing.

At t4, the e-turbo speed is equal to the highest e-turbo speed without motoring. The airflow rate is equal to the desired airflow rate and the substitution rate is equal to the desired substitution rate. After t4, the substitution rate remains equal to the desired substitution rate. The e-turbo continues to be operated without motoring due to the battery SOC remaining below the threshold SOC.

A performance of an engine system of a vehicle may be maximized by controlling an e-turbo speed, the e-turbo having an electric machine coupled to an exhaust turbine. By adjusting an amount of power generated by the electric machine, a speed of the exhaust turbine may be decreased or increased. When the speed of the exhaust turbine is increased, the compressor speed increases, thereby increasing an airflow rate. By selectively increasing or decreasing the e-turbo speed at different conditions, desired substitution rates with matching airflow rates may be achieved, which may enhance combustion conditions.

The technical effect of controlling the speed of the turbine via the electric machine is that carbon emissions may be reduced. Another technical effect is an increase in efficiency of the engine with elevated substitution rates.

The disclosure also provides support for a method, comprising adjusting an electric motor output or an engine output to control a speed of a compressor in response to a fuel substitution rate of a multi-fuel engine. A first example of the method further includes where the fuel substitution rate is a desired substitution rate, and further comprising adjusting the desired substitution rate in response to a battery state-of-charge being less than a threshold state-of-charge. A second example of the method, optionally including the first example, further includes where the fuel substitution rate is a desired substitution rate, and further comprising adjusting the speed of the compressor based at least in part on a desired airflow rate associated with the desired substitution rate. A third example of the method, optionally including one or more of the previous examples, further includes where the fuel substitution rate is a desired substitution rate, further comprising determining the desired substitution rate based at least in part on one or more of an engine speed, an engine load, an engine torque, a turbocharger speed, an ambient pressure, an ambient temperature, an intake manifold temperature, and an exhaust manifold pressure. A fourth example of the method, optionally including one or more of the previous examples, further includes measuring or calculating a fuel substitution rate to determine a current substitution rate, and comparing the current substitution rate to a desired substitution rate, and increasing the electric motor output in response to the current substitution rate being less than the desired substitution rate. A fifth example of the method, optionally including one or more of the previous examples, further includes measuring or calculating a fuel substitution rate to determine a current substitution rate, and comparing the current substitution rate to a desired substitution rate, and decreasing the electric motor output in response to the current substitution rate being greater than the desired substitution rate. A sixth example of the method, optionally including one or more of the previous examples, further includes operating at the desired substitution rate via adjusting an amount of a first fuel injected through a direct injector of an engine and adjusting an amount of a second fuel injected through a port-fuel injector of the engine, wherein the first fuel is different from the second fuel.

The present disclosure further provides support for a system comprising a first fuel system configured to supply a first fuel and coupled to a direct injector positioned to inject directly into a volume of a cylinder of an engine, a second fuel system configured to supply a second fuel and coupled to a port-fuel injector positioned to inject into an intake port of the cylinder, and the second fuel is different than the first fuel, a turbocharger having a turbine and a compressor, and a controller comprising computer-readable instructions stored on non-transitory memory thereof that when executed cause the controller to compare a current substitution rate and a desired substitution rate of the first fuel and the second fuel, and adjust a speed of the turbocharger in response to the current substitution rate not matching the desired substitution rate. A first example of the system further includes where the instructions further enable the controller to adjust operation of an electric motor that is coupled to the turbocharger to increase the speed of the turbocharger in response to one or both of: the current substitution rate being less than the desired substitution rate and a current airflow rate being less than a desired airflow rate. A second example of the system, optionally including the first example, further includes where the instructions further enable the controller to adjust operation of an electric motor that is coupled to the turbocharger to decrease the speed of the turbocharger in response to one or both of: the current substitution rate being greater than the desired substitution rate and a current airflow rate being greater than a desired airflow rate. A third example of the system, optionally including one or more of the previous examples, further includes where the first fuel is a carbon-containing fuel and the second fuel is a carbon-free fuel. A fourth example of the system, optionally including one or more of the previous examples, further includes where the instructions further enable the controller to increase the desired substitution rate in response to a battery state-of-charge being greater than or equal to a threshold state-of-charge. A fifth example of the system, optionally including one or more of the previous examples, further includes where the instructions further enable the controller to decrease the desired substitution rate in response to the battery state-of-charge being less than the threshold state-of-charge. A sixth example of the system, optionally including one or more of the previous examples, further includes where the turbocharger is an electric turbocharger and the electric motor is coupled to the turbine. A seventh example of the system, optionally including one or more of the previous examples, further includes where the first fuel is diesel and the second fuel is hydrogen.

The present disclosure further provides support for a propulsion system for a vehicle, comprising an engine comprising a cylinder, a first fuel system containing a first fuel and coupled to a direct injector positioned to inject directly into a volume of the cylinder, a second fuel system containing a second fuel and coupled to a port-fuel injector positioned to inject into an intake port of the cylinder, and the second fuel is different than the first, an electric turbocharger comprising an electric motor, a turbine and a compressor, and a controller comprising computer-readable instructions stored on non-transitory memory thereof that when executed cause the controller to adjust or maintain a substitution rate of the first fuel relative to the second fuel based at least in part on a highest available rotational speed of the compressor independent of rotational assistance from the electric motor. A first example of the propulsion system further includes where the highest available speed of the compressor with rotational assistance from the electric motor is determined only when a battery state-of-charge is greater than or equal to a threshold state-of-charge. A second example of the propulsion system, optionally including the first example, further includes where the instructions further cause the controller to adjust the desired substitution rate in response to one or more of an engine speed, an engine load, an engine torque, a turbocharger speed, an ambient pressure, an ambient temperature, an intake manifold temperature, and an exhaust manifold pressure when the battery state-of-charge is greater than the threshold state-of-charge. A third example of the propulsion system, optionally including one or more of the previous examples, further includes where the first fuel system is fluidly separated from the second fuel system. A fourth example of the propulsion system, optionally including one or more of the previous examples, further includes where the instructions further enable the controller to determine a target manifold pressure in response to a desired airflow based on the desired substitution rate, wherein the desired airflow increases as the substitution rate increases.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
adjusting an electric motor output or an engine output to control a speed of a compressor in response to a fuel substitution rate of a multi-fuel engine.

2. The method of claim 1, wherein the fuel substitution rate is a desired substitution rate, and further comprising adjusting the desired substitution rate in response to a battery state-of-charge being less than a threshold state-of-charge.

3. The method of claim 1, wherein the fuel substitution rate is a desired substitution rate, and further comprising adjusting the speed of the compressor based at least in part on a desired airflow rate associated with the desired substitution rate.

4. The method of claim 1, wherein the fuel substitution rate is a desired substitution rate, further comprising determining the desired substitution rate based at least in part on one or more of an engine speed, an engine load, an engine torque, a turbocharger speed, an ambient pressure, an ambient temperature, an intake manifold temperature, and an exhaust manifold pressure.

5. The method of claim 1, further comprising:
measuring or calculating a fuel substitution rate to determine a current substitution rate; and
comparing the current substitution rate to a desired substitution rate; and
increasing the electric motor output in response to the current substitution rate being less than the desired substitution rate.

6. The method of claim 1, further comprising:
measuring or calculating a fuel substitution rate to determine a current substitution rate; and
comparing the current substitution rate to a desired substitution rate; and decreasing the electric motor output in response to the current substitution rate being greater than the desired substitution rate.

7. The method of claim 1, further comprising operating at the desired substitution rate via adjusting an amount of a first fuel injected through a direct injector of an engine and adjusting an amount of a second fuel injected through a port-fuel injector of the engine, wherein the first fuel is different from the second fuel.

8. A system, comprising:
a first fuel system configured to supply a first fuel and coupled to a direct injector positioned to inject directly into a volume of a cylinder of an engine;
a second fuel system configured to supply a second fuel and coupled to a port-fuel injector positioned to inject into an intake port of the cylinder, and the second fuel is different than the first fuel;
a turbocharger having a turbine and a compressor; and
a controller comprising computer-readable instructions stored on non-transitory memory thereof that when executed cause the controller to:
compare a current substitution rate and a desired substitution rate of the first fuel and the second fuel; and
adjust a speed of the turbocharger in response to the current substitution rate not matching the desired substitution rate.

9. The system of claim 8, wherein the instructions further enable the controller to adjust operation of an electric motor that is coupled to the turbocharger to increase the speed of the turbocharger in response to one or both of: the current substitution rate being less than the desired substitution rate and a current airflow rate being less than a desired airflow rate.

10. The system of claim 8, wherein the instructions further enable the controller to adjust operation of an electric motor that is coupled to the turbocharger to decrease the speed of the turbocharger in response to one or both of: the current substitution rate being greater than the desired substitution rate and a current airflow rate being greater than a desired airflow rate.

11. The system of claim 8, wherein the first fuel is a carbon-containing fuel and the second fuel is a carbon-free fuel.

12. The system of claim 8, wherein the instructions further enable the controller to increase the desired substitution rate in response to a battery state-of-charge being greater than or equal to a threshold state-of-charge.

13. The system of claim 12, wherein the instructions further enable the controller to decrease the desired substitution rate in response to the battery state-of-charge being less than the threshold state-of-charge.

14. The system of claim 8, wherein the turbocharger is an electric turbocharger and the electric motor is coupled to the turbine.

15. The system of claim 8, wherein the first fuel is diesel and the second fuel is hydrogen.

16. A propulsion system for a vehicle, comprising:
an engine comprising a cylinder;
a first fuel system containing a first fuel and coupled to a direct injector positioned to inject directly into a volume of the cylinder;
a second fuel system containing a second fuel and coupled to a port-fuel injector positioned to inject into an intake port of the cylinder, and the second fuel is different than the first;
an electric turbocharger comprising an electric motor, a turbine and a compressor; and
a controller comprising computer-readable instructions stored on non-transitory memory thereof that when executed cause the controller to adjust or maintain a substitution rate of the first fuel relative to the second fuel based at least in part on a highest available rotational speed of the compressor independent of rotational assistance from the electric motor.

17. The engine system of claim 16, wherein the highest available speed of the compressor with rotational assistance from the electric motor is determined only when a battery state-of-charge is greater than or equal to a threshold state-of-charge.

18. The engine system of claim 17, wherein the instructions further cause the controller to adjust the desired substitution rate in response to one or more of an engine speed, an engine load, an engine torque, a turbocharger speed, an ambient pressure, an ambient temperature, an intake manifold temperature, and an exhaust manifold pressure when the battery state-of-charge is greater than the threshold state-of-charge.

19. The engine system of claim 16, wherein the first fuel system is fluidly separated from the second fuel system.

20. The engine system of claim 16, wherein the instructions further enable the controller to determine a target manifold pressure in response to a desired airflow based on the desired substitution rate, wherein the desired airflow increases as the substitution rate increases.

* * * * *